3,585,161
PROCESS FOR PREPARING FILMS OF POLY-γ-METHYL GLUTAMATE MODIFIED WITH URETHANE PREPOLYMER HAVING TERMINAL ISOCYANATE GROUPS
Akira Akamatsu, Kazushi Togo, Yasuo Takagi, and Ryonosuke Yoshida, Kanagawa-ken, Japan, assignors to Ajinomoto Co., Inc., Tokyo, Japan
No Drawing. Filed Sept. 17, 1969, Ser. No. 858,884
Claims priority, application Japan, Sept. 30, 1968, 43/71,016
Int. Cl. C08g 51/30, 41/04
U.S. Cl. 260—33.8UR
4 Claims

ABSTRACT OF THE DISCLOSURE

A solution of poly-γ-methyl glutamate in a chlorinated aliphatic hydrocarbon when modified by the addition of a urethane prepolymer of a molecular weight of 700 to 5,000 having two terminal isocyanate groups forms a dope from which films and coatings of mechanical properties desirable in artificial leather may be prepared.

---

This invention relates to a process for preparing films of modified poly-γ-methyl glutamate.

Poly-γ-methyl glutamate (hereinafter referred to as PMG) has recently been proposed as a leather substitute. However, films of PMG have a high elastic modulus and low elongation making them rather stiff and suitable only to form a surface layer in artificial leather.

It has now been found that films made from PMG modified with certain urethane prepolymers having terminal isocyanate groups have an improved softness and feeling similar to natural leather.

Most polyurethane prepolymers having terminal isocyanate groups are not fully compatible with solutions of PMG in chlorinated aliphatic hydrocarbons, and the white turbid solutions obtained are not suitable dopes from which films may be prepared.

Solutions having no measurable transparency or a transparency which is but a small fraction of the transparency of a 10% PMG solution were obtained when the 21 urethane prepolymers listed in Table 1 were combined in amounts of 10% or 20% (based on the PMG) with a solution containing 10% PMG in a 70:30 mixture of 1,2-dichloroethane and tetrachloroethylene, all ratios and percentage figures in this specification being by weight unless specifically stated otherwise.

Table 1 lists the diol and isocyanate components of the prepolymers together with the molecular weights of the diol components and the molecular weights of the prepolymers (P.P.), as calculated from end group determinations, and assigns identification numbers to the prepolymers.

Films were made from solutions prepared by adding 10% of several prepolymers described in Table 1 to the PMG in the solution. The opaque or white solutions were spread on a glass plate with an applicator to a thickness of 0.3 mm., air dried at 80° C., and the films formed were stripped from the plate. They had the properties listed in Table 2 which identifies the urethane prepolymer by the numbers assigned in Table 1. A control was made from the PMG solution without urethane prepolymer.

TABLE 2

| Number | Thickness | Tensile strength, kg./mm.$^2$ | Elongation, percent |
|---|---|---|---|
| Control | 31 | 2.83 | 101.3 |
| 1 | 32 | 1.84 | 88.3 |
| 2 | 32 | 2.33 | 95.3 |
| 4 | 31 | 2.20 | 94.0 |
| 5 | 32 | 2.41 | 95.2 |
| 6 | 32 | 1.63 | 60.0 |
| 7 | 32 | 1.50 | 56.4 |
| 9 | 32 | 1.48 | 56.0 |
| 11 | 32 | 1.83 | 70.2 |
| 14 | 32 | 2.21 | 95.4 |
| 16 | 32 | 1.13 | 44.3 |

It has now been found that the compatibility of a urethane prepolymer with a solution of PMG in a chlorinated aliphatic hydrocarbon solvent depends on the molecular weight of the prepolymer, on the nature of the polyester or polyether which constitutes the diol component, and on the nature of the diisocyanate component. There is little compatibility at high molecular weight of the prepolymer. At relatively low molecular weight, the terminal isocyanate groups are relatively active and react with active hydrogen in the main chain of the PMG for modification of the latter. When the urethane prepolymer is made from a polyether or polyester of relatively low molecular weight, and has a correspondingly high number of urethane linkages similar to the amide linkages of the PMG, it is compatible with the PMG solution because the solubility indexes of the PMG and of the prepolymer are similar.

For example, the solubility index of PMG is 9.7. A urethane prepolymer of molecular weight 1,200 obtained by reacting hexamethylene diisocyanate with a polyester of adipic acid and ethylene glycol having a molecular weight of 600 has a solubility index of 9.8 and is compatible with the PMG solution.

Aromatic hydrocarbon units present in the main chain of the prepolymer in great numbers impair compatibility with PMG which has no such units. Poor compatibility is therefore found in prepolymers having an aromatic diisocyanate component when combined with a polyester or polyether component of low molecular weight, and in prepolymers having aromatic hydrocarbon radicals in the polyester component.

TABLE 1

| Number | Diol | M.W. | Diisocyanate | M.W. (P.P.) |
|---|---|---|---|---|
| 1 | Polyethylene glycol | 6,000 | Xylylene | 21,000 |
| 2 | do | 4,000 | Hexamethylene | 15,400 |
| 3 | do | 1,000 | Naphthalene | 12,500 |
| 4 | do | 600 | Tolylene | 8,900 |
| 5 | do | 200 | Xylylene | 4,200 |
| 6 | Polypropylene glycol | 950 | Hexamethylene | 14,330 |
| 7 | do | 950 | Tolylene | 6,300 |
| 8 | Polyethylene adipate | 1,630 | Naphthalene | 7,350 |
| 9 | do | 1,020 | Tolylene | 8,290 |
| 10 | do | 300 | Xylylene | 1,540 |
| 11 | Polypropylene adipate | 600 | Hexamethylene | 1,480 |
| 12 | do | 1,500 | Tolylene | 9,200 |
| 13 | Polytetramethylene adipate | 1,000 | Naphthalene | 6,320 |
| 14 | do | 800 | Hexamethylene | 8,500 |
| 15 | do | 300 | Tolylene | 1,420 |
| 16 | Polyethylene terephthalate | 1,530 | do | 3,400 |
| 17 | do | 1,120 | Xylylene | 2,950 |
| 18 | do | 500 | Hexamethylene | 1,820 |
| 19 | Polyethylene maleate | 600 | do | 4,520 |
| 20 | Polyhexamethylene succinate | 1,580 | Tolylene | 7,290 |
| 21 | Polytetramethylene itaconate | 820 | do | 11,300 |

Good compatibility with PMG solutions in chlorinated aliphatic hydrocarbons has been found in urethane prepolymers having terminal isocyanate groups and a molecular weight of 700 to 5,000 as calculated from endgroup determinations, and represented by the formula $$OCN-[(X-NHCOOY_1-OCONH)_p-(X-NHCOO-Y_2-OCONH)_m]_n-X-NCO$$

Wherein X is hexamethylene, tolylene, or xylylene, each of $Y_1$ and $Y_2$ has a molecular weight of 400 to 2,000 and is a radical of a polyester having two terminal hydroxyl groups, whose acid moiety is adipic or sebacic acid, and whose alcohol moiety is ethylene glycol, diethylene glycol, triethylene glycol, or 1,4-butanediol, or a radical of polypropylene glycol, polyethylene glycol, or ethylene glycol-propylene glycol copolymer, $p$, $m$, and $n$ being positive integers.

Solutions of PMG in chlorinated aliphatic hydrocarbons which contain urethane prepolymers defined by the above formula are homogeneous and flowable even at room temperature. Films made therefrom are transparent and do not show phase separation. Their elongation is much better than that of PMG films, and their appearance and feel are similar to properties of natural leather.

Transparency values at 555 mμ were determined in solutions containing 10% PMG (degree of polymerization 800) in a 70:30 mixture of 1,2-dichloroethane and tetrachloroethylene to which 10%, 20%, 30%, 40%, 50% of sixty urethane prepolymers of the invention had been added, the percentage being based on the PMG present. The prepolymers are listed in Table 3 by identification number, molecular weight, diisocyanate component, diol component, and molecular weight of the diol component.

TABLE 3

No. 1 M.W. 1240:
  Polyethylene glycol 400
  Hexamethylene diisocyanate
No. 2 M.W. 780:
  Polyethylene glycol 400
  Xylylene diisocyanate
No. 3 M.W. 970:
  Polyethylene glycol 600
  Hexamethylene diisocyanate
No. 4 M.W. 1340:
  Polyethylene glycol 600
  Hexamethylene diisocyanate
No. 5 M.W. 1050:
  Polyethylene glycol 600
  Tolylene diisocyanate
No. 6 M.W. 4890:
  Polyethylene glycol 1000
  Hexamethylene diisocyanate
No. 7 M.W. 1430:
  Polyethylene glycol 1000
  Xylylene diisocyanate
No. 8 M.W. 1470:
  Polyethylene glycol 1000
  Tolylene diisocyanate
No. 9 M.W. 2830:
  Polyethylene glycol 1800
  Hexamethylene diisocyanate
No. 10 M.W. 1040:
  Polypropylene glycol 400
  Hexamethylene diisocyanate
No. 11 M.W. 940:
  Polypropylene glycol 400
  Tolylene diisocyanate
No. 12 M.W. 980:
  Polypropylene glycol 600
  Hexamethylene diisocyanate
No. 13 M.W. 4566:
  Polypropylene glycol 600
  Hexamethylene diisocyanate
No. 14 M.W. 840:
  Polypropylene glycol 600
  Tolylene diisocyanate
No. 15 M.W. 1360:
  Polypropylene glycol 2000
  Hexamethylene diisocyanate
No. 16 M.W. 1250:
  Polypropylene glycol 950
  Xylylene diisocyanate
No. 17 M.W. 2200:
  Polypropylene glycol 1200
  Hexamethylene diisocyanate
No. 18 M.W. 1830:
  Polypropylene glycol 1200
  Tolylene diisocyanate
No. 19 M.W. 2950:
  Copolymer eth. glycol/prop. glycol 1:6 1720
  Hexamethylene diisocyanate
No. 20 M.W. 1050:
  Mixed polyeth. glycol/polyprop. glycol 600
  Hexamethylene diisocyanate
No. 21 M.W. 1280:
  Mixed polyeth. glycol/polyprop. glycol 600
  Hexamethylene diisocyanate
No. 22 M.W. 890:
  Mixed polyeth. glycol/polyprop. glycol 600
  Tolylene diisocyanate
No. 23 M.W. 1140:
  Mixed polyeth. glycol/polyprop. glycol 600
  Tolylene diisocyanate
No. 24 M.W. 1260:
  Mixed polyeth. glycol/polyprop. glycol 1000
  Tolylene diisocyanate
No. 25 M.W. 840:
  Adipic acid/eth. glycol polyester 500
  Hexamethylene diisocyanate
No. 26 M.W. 2270:
  Adipic acid/eth. glycol polyester 600
  Hexamethylene diisocyanate
No. 27 M.W. 4960:
  Adipic acid/eth. glycol polyester 600
  Hexamethylene diisocyanate
No. 28 M.W. 1030:
  Adipic acid/eth. glycol polyester 600
  Tolylene diisocyanate
No. 29 M.W. 1580:
  Adipic acid/eth. glycol polyester 1000
  Hexamethylene diisocyanate
No. 30 M.W. 1940:
  Adipic acid/eth. glycol polyester 1000
  Hexamethylene diisocyanate
No. 31 M.W. 1450:
  Adipic acid/eth. glycol polyester 1000
  Tolylene diisocyanate
No. 32 M.W. 2800:
  Adipic acid/eth. glycol polyester 1540
  Hexamethylene diisocyanate
No. 33 M.W. 900:
  Adipic acid/dieth. glycol polyester 540
  Hexamethylene diisocyanate
No. 34 M.W. 1340:
  Adipic acid/dieth. glycol polyester 830
  Hexamethylene diisocyanate
No. 35 M.W. 1800:
  Adipic acid/dieth. glycol polyester 830
  Hexamethylene diisocyanate
No. 36 M.W. 1450:
  Adipic acid/dieth. glycol polyester 1100
  Tolylene diisocyanate
No. 37 M.W. 1600:
  Adipic acid/trieth. glycol polyester 950
  Hexamethylene diisocyanate
No. 38 M.W. 3860:
  Adipic acid/trieth. glycol polyester 950
  Tolylene diisocyanate No. 39 M.W. 920:
    Adipic acid/1,4-butanediol polyester 560
    Hexamethylene diisocyanate
No. 40 M.W. 1300:
    Adipic acid/1,4-butanediol polyester 900
    Hexamethylene diisocyanate
No. 41 M.W. 1260:
    Adipic acid/1,4-butanediol polyester 900
    Tolylene diisocyanate
No. 42 M.W. 1950:
    Adipic acid/1,4-butanediol polyester 1300
    Hexamethylene diisocyanate
No. 43 M.W. 960:
    Sebacic acid/ethylene glycol polyester 600
    Hexamethylene diisocyanate
No. 44 M.W. 1400:
    Sebacic acid/ethylene glycol polyester 600
    Hexamethylene diisocyanate
No. 45 M.W. 950:
    Sebacic acid/ethylene glycol polyester 600
    Tolylene diisocyanate
No. 46 M.W. 2950:
    Sebacic acid/ethylene glycol polyester 1500
    Hexamethylene diisocyanate
No. 47 M.W. 1240:
    Sebacic acid/dieth. glycol polyester 800
    Hexamethylene diisocyanate
No. 48 M.W. 1960:
    Sebacic acid/dieth. glycol polyester 800
    Hexamethylene diisocyanate
No. 49 M.W. 1460:
    Sebacic acid/dieth. glycol polyester 800
    Tolylene diisocyanate
No. 50 M.W. 1850:
    Sebacic acid/1,4-butanediol polyester 1000
    Hexamethylene diisocyanate
No. 51 M.W. 1490:
    Sebacic acid/1,4-butanediol polyester 1000
    Tolylene diisocyanate
No. 52 M.W. 2200:
    Adipic acid/eth. glyc./dieth. glycol p'ester 640
    Hexamethylene diisocyanate
No. 53 M.W. 960:
    Adipic ac./eth. glycol/dieth. glyc. polyester 640
    Tolylene diisocyanate
No. 54 M.W. 2200:
    Adipic ac./eth. glyc./dieth. glyc. polyester 1200
    Hexamethylene diisocyanate
No. 55 M.W. 1600:
    Sebacic/adipic ac./eth. glycol polyester 800
    Hexamethylene diisocyanate
No. 56 M.W. 1300:
    Sebacic/adipic ac./eth. glycol polyester 800
    Tolylene diisocyanate
No. 57 M.W. 2100:
    Seb./ad. ac./eth. glyc./dieth. glyc. p'ester 1000
    Hexamethylene diisocyanate
No. 58 M.W. 1800:
    Seb./ad. ac./eth. glyc./dieth. glyc. polyester 1000
    Tolylene diisocyanate
No. 59 M.W. 1400:
    Mixed ad. ac./ethyl glyc. & seb. ac./eth. glyc. 800
    Hexamethylene diisocyanate
No. 60 M.W. 1300:
    Mixed ad. ac./eth. glyc. & seb. ac./eth. glyc. 800
    Tolylene diisocyanate.

A transparency of at least 95% was obtained with 50% added prepolymers Nos. 1, 3, 4, 6, 9, 10, 13, 15, 17, 21, 25, 26, 29, 33, 34, 35, 37, 39, 40, 43, 47, 55, and 59. Additionally, at least 95% transparency was achieved with 30% added prepolymers Nos. 8, 12, 20, 27, 30, 32, 42, 44, 48, 52, 54, and 57. At 10%, all prepolymers gave transparencies over 90%, and only No. 24 gave a value of less than 95%.

Films prepared from the sixty modified PMG solutions as described above and containing 10% to 50% added urethane prepolymers of the invention had tensile strengths higher than that of the unmodified PMG film in all but four instances, elongation values substantially higher in all instances than the elongation of PMG, a sharply lower elastic modulus, a much higher plastic recovery value (after 10% extension), and approximately the same transparency. Abrasion resistance was high both with and without polyurethane prepolymer, and the test method employed did not show differences between the several films.

The polyurethane modified PMG films of the invention may be prepared by polymerizing γ-methyl glutamate-N-carboxy anhydride in a chlorinated aliphatic hydrocarbon which is a good solvent for PMG, such as methylene dichloride, chloroform, 1,2-dichloroethane, 1,1,2-trichloroethane, or mixtures thereof, and by mixing the PMG solution so obtained with the urethane prepolymer or with a solution of the same in the same type of solvent. Other chlorinated aliphatic hydrocarbons which are non-solvents for PMG may be added in amounts too small to precipitate the PMG, for example, 1,1-dichloroethane, carbon tetrachloride, 1,1,1-trichloroethane, 1,2-dichloropropane, 1,3-dichloropropane, or tetrachloroethylene.

Urethane prepolymer modified PMG of desirable properties is obtained when the percent ratio of PMG to prepolymer is between 98:2 and 50:50.

The film forming solution may be combined further with fillers, such as calcium carbonate; pigments such as titanium oxide or carbon black; plasticizers such as dioctyl phthalate, tricresyl phosphate, chlorinated diphenyl, chlorinated triphenyl, chlorinated naphthalene and paraffin; antistatic agents; dyes; and other polymers.

Films of very high transparency may be prepared by dry or wet methods, and the solutions may be employed for coating suitable substrates. The films prepared on glass plates, as described above, are useful as packaging materials. An artificial leather closely similar to the natural product may be made by spreading a thin film of a solution of urethane prepolymer modified PMG on a base or core of an artificial leather and permitting the solvent to evaporate. Paper, woven and unwoven fabrics, glass, metal, artificial or natural leather may be coated, and the solvent evaporated at ambient or elevated temperature. A wet coating of modified PMG may also be coagulated on an object by immersion in a non-solvent.

The urethane propolymers may be prepared in a conventional manner as illustrated by the following example.

EXAMPLE 1

511 g. (3.5 moles) adipic acid and 326 g. (5.25 moles) ethylene glycol were stirred at 190° C. under nitrogen until most of the water formed was distilled off. After 6 hours, the unreacted ethylene glycol was distilled off in a vacuum. The polyester formed had an acid value of 19.5, a hydroxyl value of 165.4, and a molecular weight of about 600.

When the ratio of adipic acid to diol is varied, polyesters having molecular weights of 400 to 2,000 may be obtained for use in the preparation of urethane prepolymers. Commercially available polyethers of the same molecular weight may also be employed in a manner exemplified by the following procedure.

100 g. polyester prepared as described above and 55.8 g. hexamethylene diisocyanate were stirred at 140° C. for 5 hours in an oil bath. The urethane prepolymer so obtained had a molecular weight of 1,050 and contained 8.0% terminal NCO groups. The molecular weight of the urethane prepolymer may be varied by changing the ratio of polyester (or polyether) and diisocyanate.

The preparation of films according to the invention is illustrated by the following examples.

EXAMPLE 2

5.20 kg. γ-methyl-L-glutamate-N-carboxy anhydride were suspended in 12.50 kg. 1,2-dichloroethane and polymerized at room temperature with stirring when 73 g. triethylamine were added. The PMG in the resulting solution had a degree of polymerization of 1500.

A mixture was prepared from 10.70 kg. tetrachloroethylene, 12.50 kg. 1,2-dichloroethane, and 600 g. urethane prepolymer having a molecular weight of 1,100 and made from adipic acid ethylene glycol polyester (M.W. 600) and hexamethylene diisocyanate, and added to the PMG solution. After some mixing, a clear solution was formed and had a transparency of 99.6%.

A uniform layer, 0.5 mm. thick, of solution was spread on a glass plate, and the solvent was evaporated at 80° C. The film stripped from the glass plate had a thickness of 53μ, a tensile strength of 4.45 kg./mm.$^2$ an elongation of 134.8%, an elastic modulus of 41 kg./mm.$^2$, and a transparency of 84.3%.

A layer of the modified PMG solution 0.5 mm. thick was also applied in a continuous operation at 10 meters per minute to a polyurethane leather by means of a doctor blade, the coated material was massed over a cylinder heated to 95° C., and residual solvent was evaporated in an oven at 125° C. The coated polyurethane leather was crumpled manually to impart a leather-like pattern to the coated surface. The product so obtained had an appearance and a feel closely similar to natural leather. No change was observed after 10,000 cycles of the abrasion test according to Japanese Industrial Standard K–6772, indicating that the artificial leather so produced had excellent durability.

EXAMPLE 3

A 10% solution of PMG (degree of polymerization 1200) in a 70:30 mixture of 1,2-dichloroethane and tetrachloroethylene was mixed with 10, 20, 30, 40, 50% urethane prepolymer, based on the PMG. The prepolymer had a molecular weight of 1400 and was prepared from polypropyleneglycol (M.W. 950) and xylylene diisocyanate. The five solutions were spread in respective layers 0.8 mm. thick on glass plates and dried at 60° C. The dry films stripped from the plates and a film of unmodified PMG prepared in the same manner had the properties shown in Table 4.

TABLE 4

| Added prepolymer, percent | Thickness, μ | Tensile strength, kg./mm.$^2$ | Elongation, percent | Young's modulus, kg./mm.$^2$ | Transparency, percent |
|---|---|---|---|---|---|
| 0 | 0.80 | 4.40 | 96.5 | 69 | 86.2 |
| 10 | 0.82 | 4.51 | 124 | 54 | 85.0 |
| 20 | 0.81 | 4.55 | 142 | 43 | 84.8 |
| 30 | 0.85 | 4.49 | 175 | 41 | 84.0 |
| 40 | 0.84 | 4.38 | 192 | 40 | 82.8 |
| 50 | 0.86 | 4.21 | 215 | 34 | 80.0 |

EXAMPLE 4

3 parts chlorinated triphenyl, 1 part of an antistatic agent (a phosphoric acid ester derivative), and 1 part carbon black were compounded on a paint mill, and the mixture was dissolved in 54 parts 1,2-dichloroethane. The solution was mixed homogeneously with a solution of 54 parts PMG (DP. 1500) and 7 parts urethane prepolymer (M.W. 1800) in a mixture of 340 parts 1,2-dichloroethane and 90 parts tetrachloroethylene. The prepolymer was produced from adipic acid ethylene glycol polyester (M.W. 800) and tolylene diisocyanate.

The clear liquid mixture was spread 0.5 mm. thick on a glass plate, allowed to stand at room temperature for 5 minutes, and thereafter dried at 80° C. for 20 minutes. The film stripped from the plate had a thickness of 54μ, tensile strength of 4.31 kg./mm.$^2$, elongation of 138%, and Young's modulus of 42 kg./mm.$^2$.

A product closely resembling natural leather was obtained when the liquid mixture was spread on polyurethane leather as described in Example 2. No changes were observed after 10,000 cycles of the abrasion resistance test nor discoloration or vitrification.

EXAMPLE 5

A urethane prepolymer (M.W. 950) was prepared from polyethylene glycol (M.W. 400) and hexamethylene diisocyanate, and 4 g. prepolymer were added to a solution of 20 g. PMG (DP. 2000) in 180 g. 1,2-dichloroethane. The solution so obtained had a transparency of 92%. A layer of the solution, 0.7 mm. thick, was spread on a glass plate, and then immersed in acetone to coagulate the polymer. After drying at 100° C., the film was removed from the plate and had a thickness of 72μ, a tensile strength of 5.10 kg./mm.$^2$, an elongation of 143%, and a transparency of 86.3%.

EXAMPLE 6

A urethane prepolymer (M.W. 2500) was prepared from adipic acid ethylene glycol/diethylene glycol polyester (M.W. 1500) and hexamethylene diisocyanate. The prepolymer was added to a solution of 20 parts PMG (DP. 1000) in 150 parts 1,2-dichloroethane and 30 parts tetrachloroethylene in amounts of 5, 10, 15, and 20 percent based on the PMG.

Films prepared from the solutions as in Example 2 had the properties shown in Table 5.

TABLE 5

| Percent prepolymer | Thickness, μ | Tensile strength, kg./mm.$^2$ | Elongation, percent | Young's modulus, kg./mm.$^2$ | Transparency, percent |
|---|---|---|---|---|---|
| 0 | 0.81 | 4.00 | 101.4 | 68 | 85.0 |
| 5 | 0.80 | 4.08 | 116 | 61 | 85.2 |
| 10 | 0.81 | 4.21 | 138 | 52 | 84.9 |
| 15 | 0.82 | 4.26 | 141 | 48 | 84.9 |
| 20 | 0.83 | 4.34 | 150 | 40 | 84.3 |

What is claimed is:

1. A process for preparing a modified poly-γ-methyl glutamate film which comprises:
   (a) mixing a urethane prepolymer with a solution of poly-γ-methyl glutamate in a solvent consisting essentially of chlorinated aliphatic hydrocarbon, said prepolymer
      (1) having a molecular weight of 700 to 5,000, as determined by determination of end groups,
      (2) being soluble in said solution so that the mixture obtained is clear and homogeneous, and
      (3) being of the formula OCN—[(X—NHCOO—Y$_1$—OCONH)$_p$—(X—NHCOO—Y$_2$—OCONH)$_m$]$_n$—X—NCO wherein
      X is hexamethylene, tolylene, or xylylene, each of Y$_1$ and Y$_2$ has a molecular weight of 400 to 2000 and is a radical of a polyester having two terminal hydroxyl groups, said polyester having an acid moiety which is adipic acid or sebacic acid, and an alcohol moiety which is ethylene glycol, diethylene glycol, triethylene glycol, or 1,4-butanediol, or a radical of polypropylene glycol, polyethylene glycol, or of a copolymer of ethylene glycol and propylene glycol, and
      p, m, and n are positive integers; and
   (b) removing said solvent from a layer of said mixture.

2. A process as set forth in claim 1, wherein said prepolymer is mixed with said solution in a ratio of 98 to 50 percent poly-γ-methyl glutamate to 2 to 50 percent prepolymer.

3. A film prepared by the process of claim 2.

4. A homogeneous and clear solution of poly-γ-methyl glutamate and of a urethane prepolymer in a liquid chlorinated aliphatic hydrocarbon solvent, said glutamate and said prepolymer being present in said solution in a ratio of 98:2 and 50:50, said prepolymer being of the formula

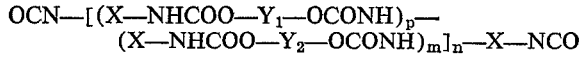

wherein
X is hexamethylene, tolylene, or xylylene,
each of $Y_1$ and $Y_2$ has a molecular weight of 400 to 2000 and is a radical of a polyester having two terminal hydroxyl groups, said polyester having an acid moiety which is adipic acid or sebacic acid, and an alcohol moiety which is ethylene glycol, diethylene glycol, triethylene glycol, or 1,4-butanediol, or a radical of polypropylene glycol, polyethylene glycol, or of a copolymer of ethylene glycol and propylene glycol, and $p$, $m$, and $n$ are positive integers.

References Cited

UNITED STATES PATENTS

| | | | |
|---|---|---|---|
| 3,089,749 | 5/1963 | Ballard | 18—54 |
| 3,369,026 | 2/1968 | Iwatsuki et al. | 260—307 |

FOREIGN PATENTS

| | | | |
|---|---|---|---|
| 698,587 | 11/1964 | Canada | 260 |

MORRIS LIEBMAN, Primary Examiner

R. ZAITLEN, Assistant Examiner

U.S. Cl. X.R.

260—78, 858